Aug. 26, 1958   I. KLEIN   2,848,938
PORTABLE FRYING APPARATUS AND DRAIN
Filed June 21, 1954   2 Sheets-Sheet 1

INVENTOR.
ISIDORE KLEIN
BY S. B. Schlessel
ATTORNEY

Aug. 26, 1958     I. KLEIN     2,848,938
PORTABLE FRYING APPARATUS AND DRAIN

Filed June 21, 1954     2 Sheets-Sheet 2

INVENTOR.
ISIDORE KLEIN
BY S. B. Schlessel
ATTORNEY

United States Patent Office 2,848,938
Patented Aug. 26, 1958

2,848,938

PORTABLE FRYING APPARATUS AND DRAIN

Isidore Klein, Elmhurst, N. Y.

Application June 21, 1954, Serial No. 438,276

2 Claims. (Cl. 99—355)

This invention relates to frying apparatus and has for its objective the provision of a portable frying apparatus, for the frying of doughnuts, fish, potato chips and similar articles of food requiring immersion in fats, which is capable of frying such articles of food on a large and continuous scale and with a minimum loss of fats, and which is of such simple and economic design and construction that it may be removed and stored in a minimum of space when not in use.

In the present state of the art the conventional type of commercial frying apparatus is of large and immovable construction, occupying a large amount of space which could otherwise be utilized, and requires fixed and complicated connection by pipes and otherwise to a heat fuel source. The conventional type of commercial frying apparatus now used lacks provision for fat conservation and presents many other disadvantages that are obviated by the present invention, as will readily be noted by examination of the herein specification.

One of the principal objects of my invention, therefore, is to provide a frying apparatus which is portable and which can be easily dismantled and stored in a small area when not in use, thus affording a great space saving.

A second important object of my invention is to provide a frying apparatus with a drain-board of novel construction by means of which excess fats clinging to the fried articles of food removed from the apparatus are enabled to drain back into the tank without loss.

A third object of my invention lies in the provision of a novel combination of drain-board and food trays by means of which successive trays of food may be cooked in a continuous series without interruption.

Another important object of my invention lies in the novel construction of the drain-board which is removable and acts as a cover for the apparatus when stored and not in use.

Still another important object of the within invention lies in the simplicity and economy of manufacture and simplicity of operation, as well as its versatility and adaptability.

Other important objects, advantages and functional features of my invention, together with the novel features of construction, combination and arrangement of parts, will readily appear from an examination of the following description, taken with the accompanying drawings which show a preferred embodiment of my invention, wherein.

Similar reference characters designate similar parts throughout the different views.

Figure 1:
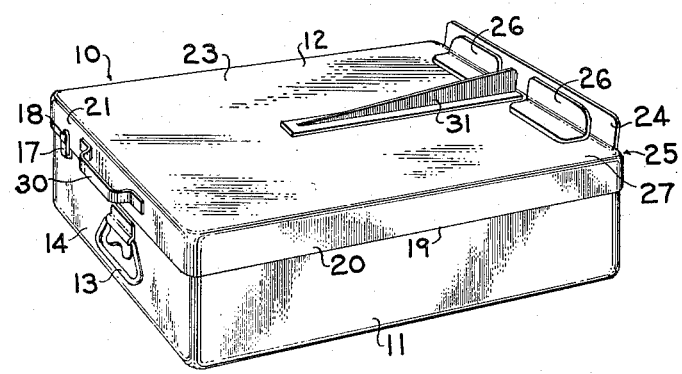
Fig. 1 is a top perspective view of the portable frying apparatus and drain in closed position, ready for storage or carrying.

Illustrative of the embodiment shown and disclosed, my invention comprises a frying apparatus 10, consisting of a deep frying tank 11 and a drain-board cover 12. The tank 11 is rectangular in shape and of a depth to contain sufficient fats so as to allow complete submersion therein of the food articles in the course of operation. The tank 11 is provided with a handle 13 attached to the exterior of one of its smaller sides 14, for portage, and with a pair of locking pins 15 extending from the upper exterior of the opposing side 16 of the tank 11, the locking pins 15 being adapted to engage the drain cover 12 as will hereinafter be shown. The side 14 is additionally provided with a snap lock 17 adapted to engage a catch 18 provided on the drain cover 12, as shown.

Figure 2:
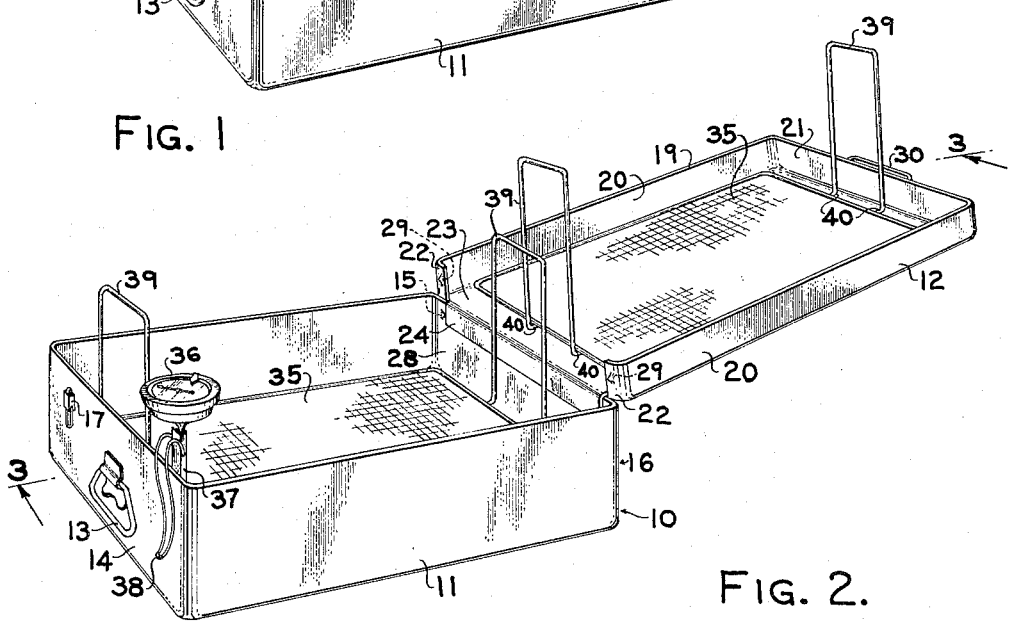
Fig. 2 is a top perspective view of the portable frying apparatus and drain ready for operation.
Figure 3:
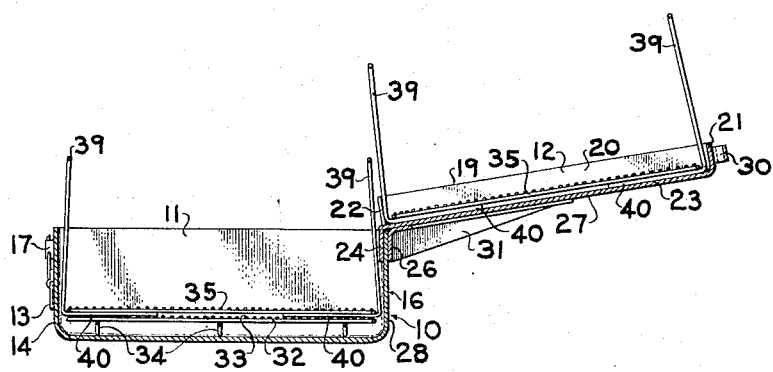
Fig. 3 is a side cross-sectional view, taken on lines 3—3 of Fig. 2.
Figure 4:
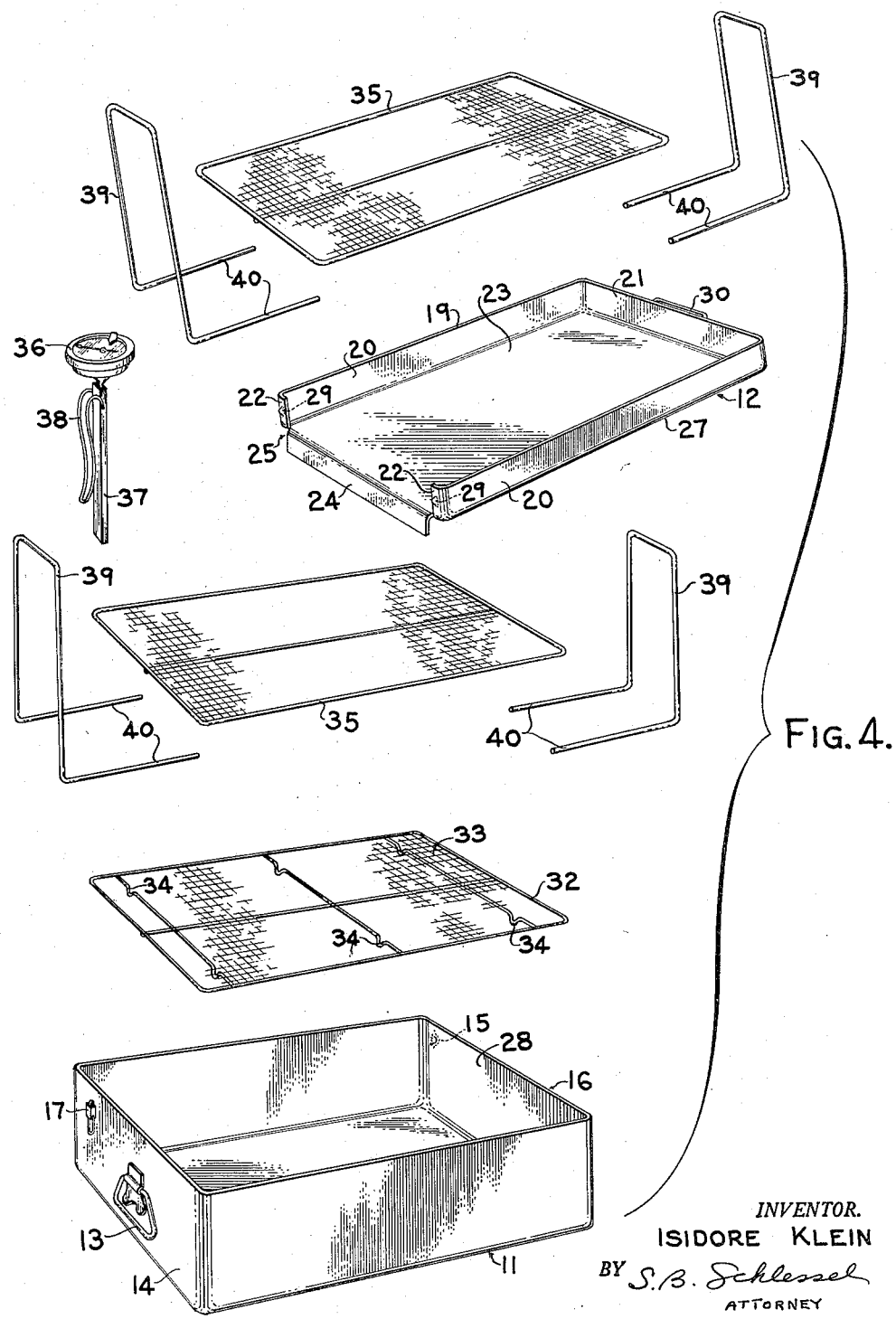
Fig. 4 is an exploded view of the portable frying apparatus and drain, showing the component parts thereof.

The drain cover 12 is provided with a vertical marginal flange 19 extending around both of its longer sides 20 and one of its shorter sides 21 and terminating at each end thereof into a curved shoulder 22 extending partly along the fourth side. The base 23 of the drain cover 12 is provided with a depending lip 24 extending downwardly therefrom in a general direction opposite to the extension of the flanges 19, the width of the lip 24 being slightly less than the length of the side 25, and having its sides terminating against the shoulders 22. The lip 24 is angled at an acute angle to the perpendicular. A pair of angle braces 26 are provided on the outer surface 27 of the drain cover 12, parallel with the lip 24 and spaced therefrom the width of the wall 28, the lip 24 and the angle braces 26 being adapted to engage the opposite sides of the wall 28 in snug-fit relationship when the drain cover 12 is reversed and secured to the wall 28 by insertion of the upper section of the wall 28 between the lip 24 and the angle braces 26. By reason of the angled disposition of the lip 24 and the angle braces 26 the drain cover 12 is supported on the wall 28 of the tank 11 at a downward slant, as shown in Figs. 2 and 3, so as to permit drainage of fat from the drain cover 12 into the tank 11 as will hereinafter be shown.

The inner surfaces of the shoulders 22 are each provided with a recess 29 which are adapted to come in registry with and be engaged by the locking pins 15 when the drain cover 12 is placed upon the tank 11, so as to secure the drain cover 12 upon the tank 11 with the flange 19 in engagement with the walls of the tank 11 and with the snap lock 17 secured to the catch 18.

The drain cover 12 is further provided with a handle 30 secured to the vertical flange 19, and with a tapering support shoulder 31 secured thereto and extending at right angles therefrom, the edge thereof protruding between the braces 26 parallel with the lip 24 and in line with the braces 26, the support shoulder 31 adapted to sustain the drain cover 12 in slanted engagement with the tank 11 with greater rigidity.

The tank 11 is provided with a drainage base 32 comprising a screen 33 and a plurality of footed supports 34 adapted to space the base 32 from the bottom of the tank 11 so as to permit drainage of sediment to the bottom of the tank 11. A series of food trays 35 constructed of mesh wire, identical to the drainage base 32 but lacking supports 34 are also provided, adapted to support the food articles within the tank during the cooking or frying operation. The frying apparatus is further provided with a thermometer 36 to gauge the temperature of the cooking fat, the thermometer 36 being supported in a scabbard 37 provided with a resilient finger 38 to secure the scabbard 37 containing the thermometer 36 to a wall of the tank 11. A series of independent handles 39, U-shaped and with right angle extensions 40, are provided, adapted to raise and lower the food trays 35 into the tank 11.

In the operation of my invention the drain cover 12 is removed from the tank 11 which is then placed upon any existing range using gas, coal, oil, electric or any other heating means used normally in any bakery, restaurant or kitchen. The drain cover 12 is reversed and secured to the tank 11 in slanted position, as shown by Figs. 2 and 3, with the depending lip 24 extending into the tank 11. The drainage base 32 is placed within the tank 11 and the tank filled to the required depth with fat or oil and heat applied until the fat reaches the required temperature for the cooking or frying process, the thermometer 36 being secured to the wall of the tank 11 with its end immersed in the fat to check the necessary temperature. Assuming that it is desired to cook doughnuts, the doughnuts in raw state are placed upon one of the food trays 35 which is supported by a pair of handles 39, and by means of the handles 39 the tray 35 is lifted up and lowered into the cooking fat until it rests upon the drainage base 32, completely immersed in the cooking fat. When the cooking process has been completed the tray 35 is lifted out of the tank 11 by means of the handles 39 and set upon the drain cover 12, as shown in Fig. 2, and a second tray 35 containing a fresh supply of raw doughnuts, which has been prepared in the interim, is lowered into the cooking fat by means of handles 39 in like manner. In the meantime the excess fat clinging to the cooked doughnuts of the first tray 35 drains thereupon to the base of the drain cover 12, and, because of its incline, the fat is drained back into the tank 11 over the lip 24. When the excess fat has been completely drained from the tray 35 it is removed from the drain cover 12 and shelved, making room for the next successive tray of cooked doughnuts.

In this manner a continuous cooking process is made available for a large scale production. The novel design of my invention also makes a better product inasmuch as excess fat is drained from the food articles instead of being absorbed by them in which event they become saturated and ill-tasting. It also assures maximum recovery of fat for further use. It eliminates individual removal of each food article separately, as they are removed by the trayful without further handling.

As it is obvious, my invention may be made in different sizes. It may be made in a number of larger sizes for commercial use and may also be made in a smaller size for home use.

In the construction of the portable frying apparatus, the tank, drain cover and other elements may be made of any suitable material for proper heat conductivity. I prefer the use of aluminum for the tank and other elements inasmuch as this metal permits easy cleaning as well as good conductivity of heat. Other metals and alloys may be used, however.

In connection with the dismantling of the frying apparatus, after it has been cleaned, the parts, such as the drainage base 32, food trays 35, thermometer 36, scabbard 37 and handles 39 are placed within the tank 11. The drain cover 12 is then lifted off the tank 11, reversed and placed upon the tank 11 so that the locking pins 15 fit into the shoulder recesses 29 and the snap lock 17 on the tank 11 engages the catch 18 on the drain cover 12. The frying apparatus may then be stored compactly in a small space.

The embodiment shown and described is by way of illustration only, and various changes may be made in the construction and arrangement of parts, as well as substitution of equivalents, without limitation upon or departure from the spirit and scope of the invention, or sacrificing any of the advantages thereof inherent therein, and the illustration is not intended as a limitation.

Having described my invention, I claim:

1. In combination with a tank of the type described, a drain cover comprising a base, a marginal flange extending around three sides of the base and the corners of the remaining side, a lip provided along the unflanged length of the remaining side of the base and extending therefrom in a direction substantially opposite the flange, brace means provided on the outer surface of the base adjacent to and parallel with the lip and adapted therewith to define a slot, the drain cover in reversed position adapted to be detachedly secured to the tank by engagement of the tank wall between the lip and the brace means to support the drain cover in angled engagement with the tank so as to allow drainage of liquids from the drain cover into the tank.

2. A portable frying apparatus comprising a tank and a removable cover, the cover comprising a base plate and a peripheral flange extending along three sides thereof and the corners of the remaining side, the flange being adapted to over-lap the sides of the tank in closed engagement of the cover therewith, the remaining side of the base plate being provided along its remaining length with a lip extending in direction substantially opposite the flange, a pair of brace members provided on the exterior surface of the base plate adjacent to and parallel with the lip and adapted to define therewith an angled slot, the lip and brace members being adapted to detachedly engage the side wall of the tank between them, in a reversed position of the cover, so as to support the cover upon the side wall of the tank at an inclined angle with its lip within the tank, to allow drainage of liquids from the cover over the lip and into the tank, the base plate being further provided with a support shoulder intermediate the brace members and perpendicular thereto, with its edge in alignment with the inner surfaces of the brace members.

References Cited in the file of this patent

UNITED STATES PATENTS

| | | |
|---|---|---|
| 810,859 | Hanegraaf | Jan. 23, 1906 |
| 1,025,630 | Von Krogoll | May 7, 1912 |
| 1,330,564 | Winkler | Feb. 10, 1920 |
| 2,262,538 | Olson et al. | Nov. 11, 1941 |